July 5, 1949.  L. K. COURCIER  2,475,080
OIL BARREL GAUGE
Filed May 23, 1947
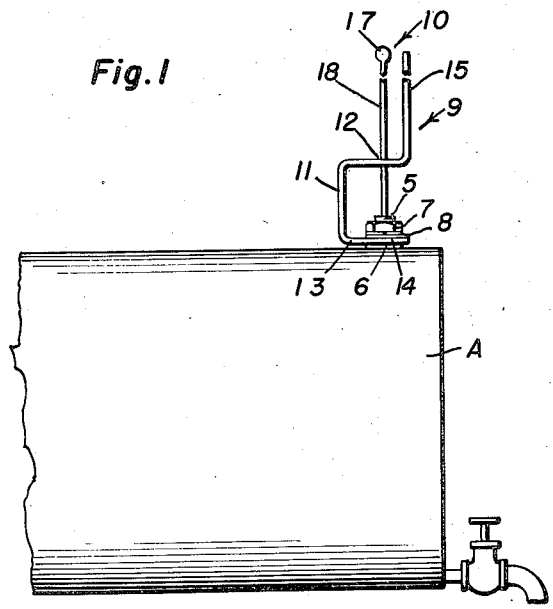
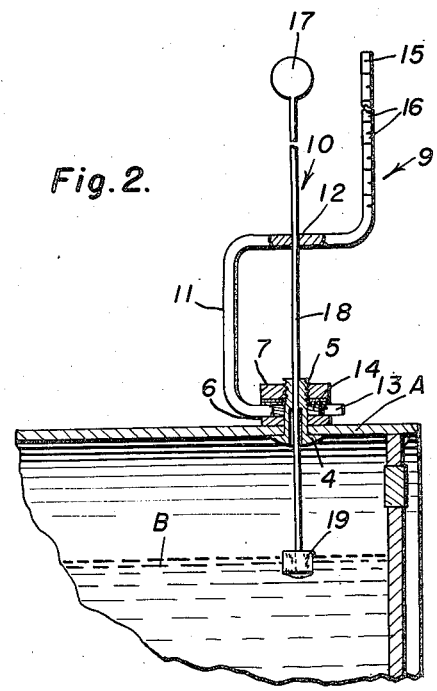
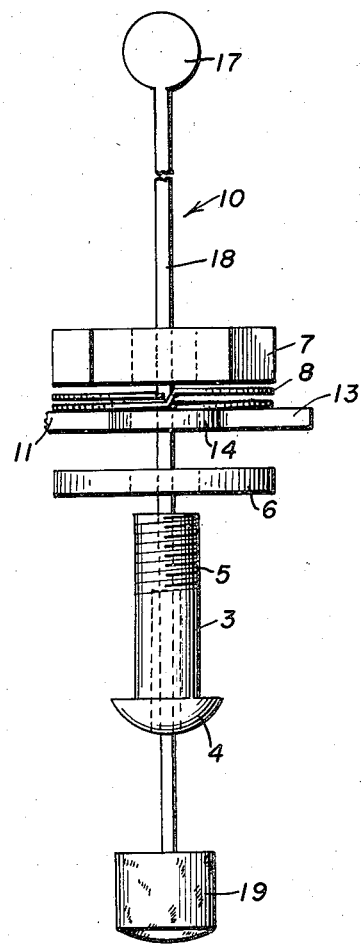
Inventor
Louis K. Courcier
By *Clarence A. O'Brien and Harvey B. Jacobson*
Attorneys Patented July 5, 1949

2,475,080

UNITED STATES PATENT OFFICE 2,475,080

OIL BARREL GAUGE

Louis K. Courcier, Eugene, Oreg.

Application May 23, 1947, Serial No. 750,031

3 Claims. (Cl. 73—322)

The present invention relates to a novel and improved gauge, one which includes a float and which is adapted to be used in connection with liquid, particularly fuel oil such as is contained, for example, in barrels and drums.

Although the usefulness and purposes of the invention is not to be restricted to any particular field of usage, the improved gauge was expressly perfected to serve in drums and barrels such as are used on racks outside of rural dwellings and the like, where two or more barrels are utilized to supply fuel for the furnace, stove or other purposes.

It is an object of the invention, therefore, to provide a simple, practical and expedient float and means for mounting same on a barrel, the float having an indicator and said indicator being cooperable with a fixed scale or other guide to enable the observer to estimate, at all times, the amount of fuel in the drum.

More explicitly, the invention has to do with a centrally bored or hollow bolt to accommodate an assembling and clamping nut with the bolt serving as a guide and retention means for a float rod, and the bolt and nut co-acting in attaching a combination guide and gauge to the drum for co-action with the indicator on the float rod.

Other objects and advantages will become more readily apparent from the following description and the accompanying illustrative drawings.

In the drawings, wherein like numerals are employed to designate like parts throughout the views:

Figure 1 is a fragmentary side elevational view of a drum, barrel or the like, equipped with an improved oil level gauge constructed in accordance with the principles of this invention;

Figure 2 is a fragmentary sectional and elevational view, on a slightly enlarged scale, to bring out the details with greater particularity; and Figure 3 is an enlarged elevational view illustrating the float per se and attaching means therefor.

Referring now to the drawings by distinguishing reference numerals and first to Figure 3, it will be seen that the aforementioned hollow or centrally bored bolt is denoted by the numeral 3. The headed end 4 of this is adapted for anchorage on the interior of the drum A as shown in Figure 2. The threaded end 5 protrudes through and beyond the surface of the drum to accommodate a washer 6 and an assembling and clamping nut 7. The nut forces the washer down against the surface of the drum as illustrated. In addition, a spring is employed in the assembly, this as denoted at 8. What is more, the nut, washer and bolt means is also employed to secure a guide and gauge member or unit 9 in place. The unit 9 serves to accommodate the float means 10. It comprises a substantially U-shaped part 11 whose upper horizontal arm is apertured, as at 12, to provide a guide opening and whose lower arm 13 is provided with a ring-like fitting 14 which is interposed between the washer and nut and which surrounds the bolt, as shown advantageously in Figure 2. The upper stem portion 15 constitutes the gauge and this is provided, wherever necessary, with a scale formed from suitable graduations 16. These graduations serve to co-act with the indicator disc, head or the like 17 on the upper end of the rod 18 of the float. The float per se is denoted by the numeral 19 and is here shown resting on the surface of the liquid B. It follows therefore, that all that is necessary is to puncture a hole in the tank or drum and to apply the bolt and nut means as a suitable accommodation for the float and gauge. The gauge rod works up and down through the guide opening 12 and the head 17, which is an indicator or index, co-acts with the graduations on the scale.

Many and varied attempts have been made to meet demands of the trade and prospective users in this line of endeavor, some acceptably resultful, others not. Keeping in mind recognized steering guides in the known state of development of the prior art under advisement, and the individual and collective efforts of those working in the same field, I have produced a carefully thought out structural adaptation which is destined, it is submitted, to achieve desired commercial and other ends.

Having now described the invention herein disclosed in full, clear and seemingly appropriate terms with a view toward enabling persons skilled in this art to make, construct and use the same; and, having explained those principles which distinguish it from other inventions in the same category, I hereby and now particularly point out and distinctly claim such phases and aspects thereof which I desire, this in a manner to enable me to obtain exclusive rights thereto.

I claim:

1. An oil level indicator attachment for an oil drum having an opening therein, a hollow-headed rivet, the shank of said rivet extending outwardly through the opening in the container, the head being disposed on the interior of the drum and serving as an anchor, the shank portion of said rivet being screw-threaded, retaining means for said rivet comprising a nut threaded on said shank, a float equipped rod slidably operable through the bore in said rivet, said rod being provided on its upper end with an indicator element, and a guide fixture detachably secured at its lower end to said rivet, the upper end of said guide fixture including a stem and said stem being graduated and said graduations constituting a scale, said indicator element cooperating with said graduations.

2. An attachment for a drum or the like comprising a hollow-headed bolt, a float rod slidable through said bolt, a float on the lower end of said rod, an indicator head on the upper end of the rod, a washer and nut connectible with said bolt for mounting the latter in place, a horizontally disposed U-shaped member, the lower arm of said U-shaped member having a guide-eye, said guide-eye being interposed between the nut and washer, said float rod extending through said guide-eye, said U-shaped member also including a guide opening and the intermediate guide portion of said rod being slidable up and down through said opening, the upper arm of the U-shaped member having a vertical stem portion and said stem portion being graduated by a scale and the indicator on the upper end of said rod being cooperable with the graduations of the said scale.

3. In a structure of the class described, a drum having an opening, a U-shaped member, the lower arm of said U-shaped member resting on the exterior of said drum and having a guide eye registerable with the opening in said drum, a float rod slidable through said opening and guide eye, said float rod having an indicator element and a float element, and means for securing said eye on the drum in aligning relationship with the opening in the drum, the upper arm of the U-shaped member being provided with a vertical stem, said stem being graduated and providing a scale and said indicator element being cooperable with the graduations constituting said scale.

LOUIS K. COURCIER.

REFERENCES CITED

The following references are of record in the file of this patent:

UNITED STATES PATENTS

| Number | Name | Date |
|---|---|---|
| 48,296 | McGirr | June 20, 1865 |
| 1,386,903 | Short | Aug. 9, 1921 |
| 2,111,683 | Van De Lune | Mar. 22, 1938 |

FOREIGN PATENTS

| Number | Country | Date |
|---|---|---|
| 584,568 | France | Nov. 22, 1924 |